United States Patent
Lee et al.

(10) Patent No.: US 10,134,365 B2
(45) Date of Patent: *Nov. 20, 2018

(54) IMAGE PROCESSING METHOD AND IMAGE PROCESSING DEVICE FOR PERFORMING THE SAME

(71) Applicant: Samsung Display Co., Ltd., Yongin-si, Gyeonggi-do (KR)

(72) Inventors: Chang-Hoon Lee, Seoul (KR); Il-Nam Kim, Hwaseong-si (KR); Jong-In Baek, Suwon-si (KR); Yi-Joon Ahn, Seoul (KR); Won-Sang Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,416

(22) Filed: Nov. 18, 2016

(65) Prior Publication Data
US 2017/0069296 A1    Mar. 9, 2017

Related U.S. Application Data

(63) Continuation of application No. 14/562,296, filed on Dec. 5, 2014, now Pat. No. 9,552,795.

(30) Foreign Application Priority Data

May 23, 2014    (KR) ........................ 10-2014-0062068

(51) Int. Cl.
*G09G 5/14*    (2006.01)
*G09G 5/10*    (2006.01)
(Continued)

(52) U.S. Cl.
CPC ................ *G09G 5/18* (2013.01); *G06T 11/60* (2013.01); *G09G 3/20* (2013.01); *G09G 5/02* (2013.01);
(Continued)

(58) Field of Classification Search
CPC combination set(s) only.
See application file for complete search history.

(56) References Cited

U.S. PATENT DOCUMENTS 7,210,787 B2    5/2007  Kim et al.
7,635,185 B2    12/2009 Matsuo et al.
(Continued)

FOREIGN PATENT DOCUMENTS

CN    1303458 C    3/2007
CN    1953723 A    4/2007
(Continued)

OTHER PUBLICATIONS

Office Action dated Dec. 5, 2017 in corresponding Chinese Patent Application No. 201510169598.1.

*Primary Examiner* — Wesner Sajous
(74) *Attorney, Agent, or Firm* — Lewis Roca Rothgerber Christie LLP

(57) ABSTRACT

An image processing method and image processing device for performing the same are disclosed. In one aspect, the image processing method includes transmitting a content image having a visual condition to a display unit. The method also includes periodically changing the visual condition from a first visual condition to a second visual condition according to a modulation timing such that the content image to be displayed after the modulation timing has the second visual condition different from the first visual condition before commencement of the modulation timing.

19 Claims, 11 Drawing Sheets

(51) Int. Cl.
  *G09G 5/02*   (2006.01)
  *G06T 5/00*   (2006.01)
  *G06T 5/40*   (2006.01)
  *G06T 11/60*  (2006.01)
  *H04N 1/60*   (2006.01)
  *H04N 1/38*   (2006.01)
  *G09G 5/18*   (2006.01)
  *H04N 9/73*   (2006.01)
  *H04N 5/20*   (2006.01)
  *G09G 3/20*   (2006.01)

(52) U.S. Cl.
  CPC .............. *G09G 5/10* (2013.01); *H04N 5/20* (2013.01); *H04N 9/73* (2013.01); *G09G 2310/08* (2013.01); *G09G 2320/064* (2013.01); *G09G 2320/0653* (2013.01); *G09G 2320/0666* (2013.01); *G09G 2320/0673* (2013.01); *G09G 2360/16* (2013.01)

(56) References Cited

U.S. PATENT DOCUMENTS

| | | | |
|---|---|---|---|
| 9,144,136 B2* | 9/2015 | Hong | H05B 33/0869 |
| 2001/0017645 A1* | 8/2001 | Toda | H04N 1/047 |
| | | | 347/116 |
| 2004/0233342 A1 | 11/2004 | Kim et al. | |
| 2005/0012904 A1 | 1/2005 | Kim et al. | |
| 2005/0168491 A1* | 8/2005 | Takahara | G09G 3/006 |
| | | | 345/690 |
| 2011/0175925 A1* | 7/2011 | Kane | G01J 1/42 |
| | | | 345/589 |
| 2011/0248904 A1* | 10/2011 | Miyawaki | G02B 27/017 |
| | | | 345/7 |
| 2013/0216204 A1 | 8/2013 | Kulakov | |
| 2013/0278631 A1 | 10/2013 | Border et al. | |
| 2014/0028697 A1* | 1/2014 | Kurtz | G01J 3/465 |
| | | | 345/589 |
| 2014/0053180 A1* | 2/2014 | Shoykher | G06F 3/017 |
| | | | 725/14 |
| 2014/0053198 A1* | 2/2014 | Sirpal | H04N 21/8173 |
| | | | 725/43 |
| 2014/0208263 A1* | 7/2014 | Maklouf | G06T 11/203 |
| | | | 715/802 |
| 2014/0240464 A1* | 8/2014 | Lee | G01S 17/08 |
| | | | 348/47 |

FOREIGN PATENT DOCUMENTS

| | | |
|---|---|---|
| CN | 202679497 U | 1/2013 |
| JP | 5245026 B2 | 4/2013 |
| KR | 10-1999-0048705 A | 7/1999 |
| WO | WO 2013/065900 A1 | 5/2013 |

* cited by examiner

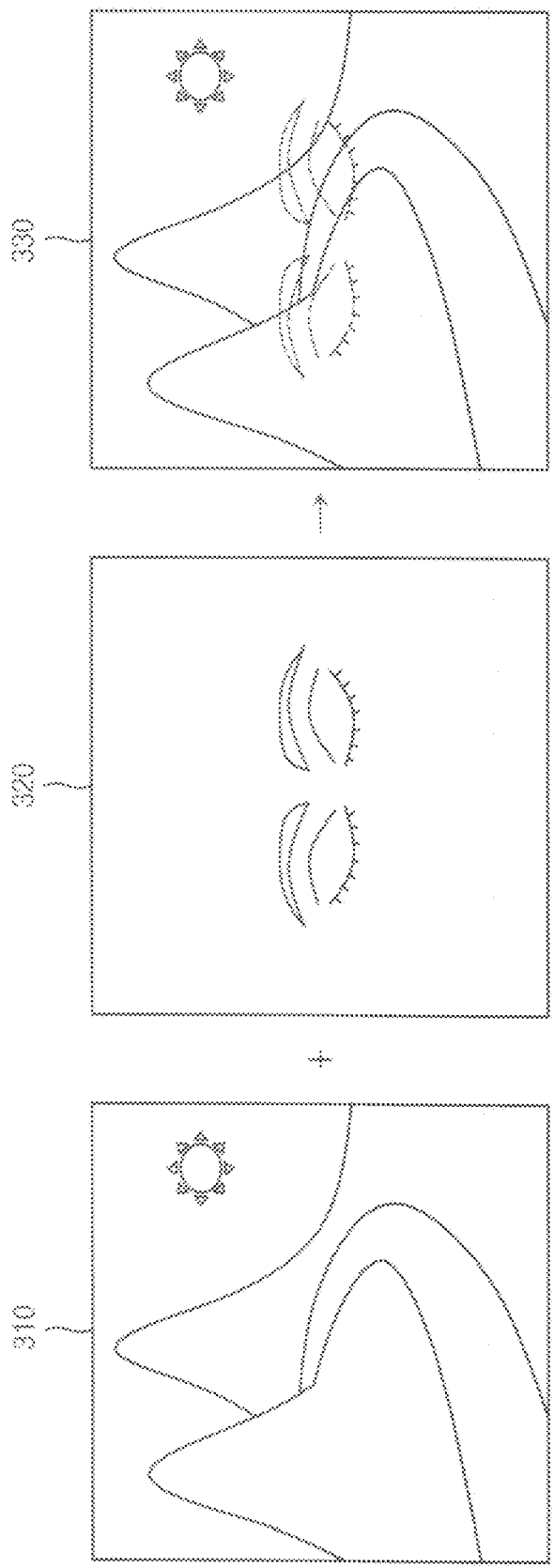

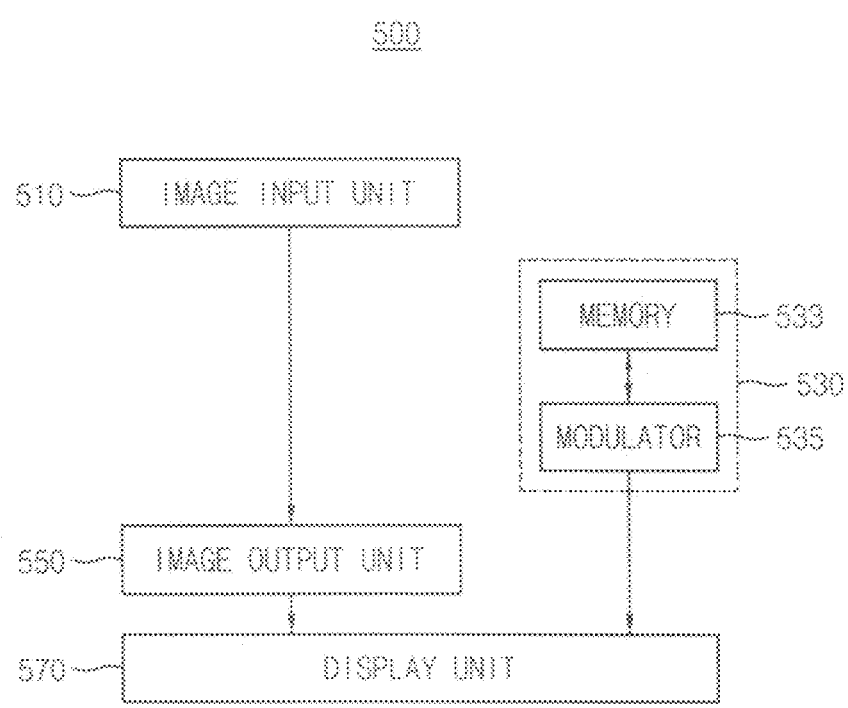

IMAGE PROCESSING METHOD AND IMAGE PROCESSING DEVICE FOR PERFORMING THE SAME

INCORPORATION BY REFERENCE TO ANY PRIORITY APPLICATIONS

This application is a continuation of U.S. patent application Ser. No. 14/562,296, filed Dec. 5, 2014, which claims priority under 35 U.S.C. § 119 to Korean Patent Application No. 10-2014-0062068, filed on May 23, 2014 in the Korean Intellectual Property Office (KIPO), the disclosures of which are incorporated by reference herein in their entireties.

BACKGROUND

Field

The inventive technology generally relates to an image processing method and an image processing device for performing the image processing method.

Description of the Related Technology

As slim and low power display panels are continuing to be developed, they are growing in popularity. For example, mobile phones and tablet computers are widely used due to various advantages such as portability. Such electronic devices can provide the viewer with digital content anywhere at virtually any time.

SUMMARY OF CERTAIN INVENTIVE ASPECTS

One inventive aspect is an image processing method.

Another aspect is an image processing device for performing the image processing method.

Another aspect is an image processing method that can output a content image having a visual condition to a display unit, and periodically change the visual condition of the content image from a first visual condition to a second visual condition at a modulation timing such that the content image after the modulation timing has the second visual condition that is distinguishable by human eyes from the first visual condition of the content image before the modulation timing.

In example embodiments, a period of the modulation timing can be an average blinking period of the human eyes.

In example embodiments, the visual condition of the content image can include at least one of a color, a color temperature, a luminance and a gamma index of the content image.

In example embodiments, the visual condition of the content image can be sustained as the first visual condition until the modulation timing, and the visual condition can be changed from the first visual condition to the second visual condition at the modulation timing, and the change of the visual condition is recognizable by the human eyes.

In example embodiments, the visual condition of the content image can be gradually changed to the first visual condition until the modulation timing, and the gradual change of the visual condition is unrecognizable by the human eyes. The visual condition of the content image can be suddenly changed from the first visual condition to the second visual condition at the modulation timing, and the sudden change of the visual condition is recognizable by the human eyes.

In example embodiments, the visual condition of the content image can be changed based on MacAdam ellipse of a predetermined color.

In example embodiments, the visual condition of the content image can be changed in an outer-ellipse having an extra area greater than an area of the MacAdam ellipse.

Another aspect is an image processing method that can receive a content image, synthesize a conformity image having a visual condition with the content image to generate a synthesized image such that the synthesized image is undistinguishable by human eyes from the content image, output the synthesized image to a display unit, and periodically change the visual condition of the conformity image in the synthesized image from a first visual condition to a second visual condition at a modulation timing such that the conformity image after the modulation timing has the second visual condition that is distinguishable by human eyes from the first visual condition of the conformity image before the modulation timing.

In example embodiments, the image processing method can adjust a grayscale level of the conformity image based on a grayscale level of the content image, and overlap the conformity image having the adjusted grayscale level with the content image.

In example embodiments, the visual condition of the conformity image can include at least one of a color, a color temperature, a luminance and a gamma index of the conformity image.

In example embodiments, the visual condition of the conformity image can be sustained as the first visual condition until the modulation timing, and the visual condition can be changed from the first visual condition to the second visual condition at the modulation timing, and the change of the visual condition is recognizable by the human eyes.

In example embodiments, the visual condition of the conformity image can be gradually changed to the first visual condition until the modulation timing, and the gradual change of the visual condition is unrecognizable by the human eyes. The visual condition of the conformity image can be suddenly changed from the first visual condition to the second visual condition at the modulation timing, and the sudden change of the visual condition is recognizable by the human eyes.

In example embodiments, the visual condition of the conformity image can be changed based on MacAdam ellipse of a predetermined color.

In example embodiments, the visual condition of the conformity image can be changed in an outer-ellipse having an extra area greater than an area of the MacAdam ellipse.

In example embodiments, a period of the modulation timing is an average blinking period of the human eyes.

Another aspect is an image processing device that can include an image input unit configured to receive a content image having a visual condition, a modulator configured to periodically change the visual condition of the content image from a first visual condition to a second visual condition at a modulation timing such that the content image after the modulation timing has the second visual condition that is distinguishable by human eyes from the first visual condition of the content image before the modulation timing, and an image output unit configured to output the content image to a display unit.

In example embodiments, the visual condition of the content image can include at least one of a color, a color temperature, a luminance and a gamma index of the content image.

In example embodiments, the modulator can generate a control signal changing a luminance or a gamma index of the display unit, and the luminance or the gamma index of the display unit can be changed by the control signal.

In example embodiments, the modulator can receive the content image from the image input unit, and generate a modulated image by modulating the content image, and the image output unit can receive the modulated image from the modulator, and output the modulated image to the display unit.

In example embodiments, the modulator can gradually change the visual condition of the content image to the first visual condition until the modulation timing, and the gradual change of the visual condition is unrecognizable by the human eyes. The modulator can suddenly change the visual condition of the content image from the first visual condition to the second visual condition at the modulation timing, and the sudden change of the visual condition is recognizable by the human eyes.

Another aspect is an image processing method comprising transmitting a content image having a visual condition to a display unit and periodically changing the visual condition from a first visual condition to a second visual condition according to a modulation timing such that the content image to be displayed after the modulation timing has the second visual condition different from the first visual condition before commencement of the modulation timing.

In the above method, the period of the modulation timing is substantially the same as the a desired blinking period of eyes.

In the above method, the visual condition includes at least one of a color, a color temperature, a luminance and a gamma index of the content image.

In the above method, the visual condition is maintained as the first visual condition until the commencement of the modulation timing.

In the above method, the visual condition is i) gradually changed to the first visual condition until the modulation timing and ii) suddenly changed from the first visual condition to the second visual condition at the modulation timing, wherein the gradual change is unrecognizable by a viewer of the content image, and wherein the rate of the sudden change is greater than the rate of the gradual change such that the sudden change is recognizable by the viewer.

In the above method, the visual condition is changed based on a MacAdam ellipse of a predetermined color. In the above method, the visual condition is changed in an outer-ellipse having an extra area greater than the area of the MacAdam ellipse.

Another aspect is an image processing method comprising receiving a content image, synthesizing a conformity image having a visual condition with the content image so as to generate a synthesized image to be displayed such that the synthesized image is indistinguishable from the content image, transmitting the synthesized image to a display unit, and periodically changing the visual condition from a first visual condition to a second visual condition at a modulation timing such that the conformity image after the modulation timing has the second visual condition that is different from the first visual condition before commencement of the modulation timing.

In the above method, the synthesizing includes adjusting grayscale levels of the conformity image based at least in part on grayscale levels of the content image and overlapping the conformity image having the adjusted grayscale levels with the content image.

In the above method, the visual condition includes at least one of a color, a color temperature, a luminance and a gamma index of the conformity image. In the above method, the visual condition is maintained as the first visual condition until the modulation timing.

In the above method, the visual condition is i) gradually changed to the first visual condition until the modulation timing and ii) suddenly changed from the first visual condition to the second visual condition at the modulation timing, wherein the gradual change is unrecognizable by the viewer of the synthesized image, and wherein the rate of the sudden change is greater than the rate of the gradual change such that the sudden change is recognizable by the viewer.

In the above method, the visual condition is changed based on a MacAdam ellipse of a predetermined color. In the above method, the visual condition is changed in an outer-ellipse having an extra area greater than the area of the MacAdam ellipse.

In the above method, the period of the modulation timing is substantially the same as a desired blinking period of eyes.

Another aspect is an image processing device comprising an image input unit configured to receive a content image having a visual condition, a processor configured to periodically change the visual condition from a first visual condition to a second visual condition at a modulation timing such that the content image to be displayed after the modulation timing has the second visual condition that is different from the first visual condition before commencement of the modulation timing, and an image output unit configured to transmit the content image to a display unit.

In the above device, the visual condition includes at least one of a color, a color temperature, a luminance and a gamma index of the content image.

In the above device, the processor is further configured to generate a control signal for changing a luminance or a gamma index of the display unit, wherein the luminance or the gamma index of the display unit is configured to be changed by the control signal.

In the above device, the processor is further configured to i) receive the content image from the image input unit and ii) generate a modulated image by modulating the content image, wherein the image output unit is further configured to i) receive the modulated image from the processor and ii) transmit the modulated image to the display unit.

In the above device, the processor is further configured to i) gradually change the visual condition to the first visual condition until the modulation timing and ii) suddenly change the visual condition from the first visual condition to the second visual condition at the modulation timing, wherein the gradual change of the visual condition is unrecognizable by a viewer of the content image, and wherein the rate of the sudden change is greater than the rate of the gradual change such that the sudden change is recognizable by the viewer.

Therefore, an image processing method according to example embodiments can periodically stimulate a viewer's eyes at each modulation timing by suddenly changing a visual condition of a content image (or a conformity image) at each modulation timing. Accordingly, a viewer can subliminally blink at each modulation timing. Further, the image processing method can synthesize the conformity image with the content image, such that synthesized image is undistinguishable by human eyes from the content image. The conformity image can be synthesized with the content image as an afterimage in the synthesized image. Accordingly, the synthesized image can not be excessively distorted from the content image. Thus, although the viewer watches some contents for a long time, the viewer's eyes can not be tired, and the dry eyes syndrome and the eyesight deterioration can be effectively prevented by the image processing method.

Further, an image processing device according to example embodiments can include a modulator suddenly changing a visual condition of a content image at each modulation timing. Thus, the viewer can subliminally blink at each modulation timing. The image processing device can effectively prevent the viewer from the dry eyes syndrome and the eyesight deterioration.

BRIEF DESCRIPTION OF THE DRAWINGS

FIG. 9 is an image diagram illustrating an example of synthesizing a conformity image with a content image by the method of FIG. 8.

FIG. 12 is a block diagram illustrating an image processing device according to another example embodiment.

DETAILED DESCRIPTION OF CERTAIN INVENTIVE EMBODIMENTS

Figure 1:
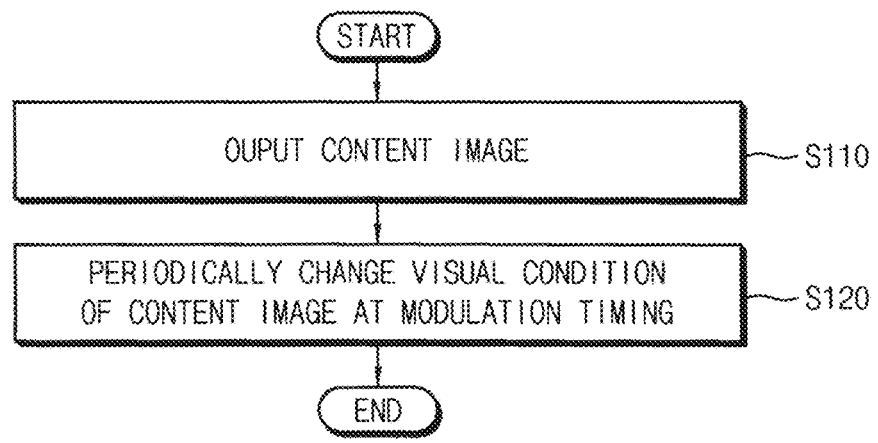
FIG. 1 is a flowchart illustrating an image processing method according to example embodiments.

When viewing small form factor displays such as those provided by portable electronic devices, for lengthy periods, one's eyesight acuity is reduced from exposure to electromagnetic waves and light.

Various example embodiments will be described more fully hereinafter with reference to the accompanying drawings, in which some example embodiments are shown. The described technology can, however, be embodied in many different forms and should not be construed as limited to the example embodiments set forth herein. Rather, these example embodiments are provided so that this disclosure will be through and complete, and will fully convey the scope of the described technology to those skilled in the art. In the drawings, the sizes and relative sizes of layers and regions can be exaggerated for clarity. Like numerals refer to like elements throughout.

It will be understood that, although the terms first, second, third etc. can be used herein to describe various elements, these elements should not be limited by these terms. These terms are used to distinguish one element from another. Thus, a first element discussed below could be termed a second element without departing from the teachings of the described technology. As used herein, the term "and/or" includes any and all combinations of one or more of the associated listed items.

It will be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the described technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2A:
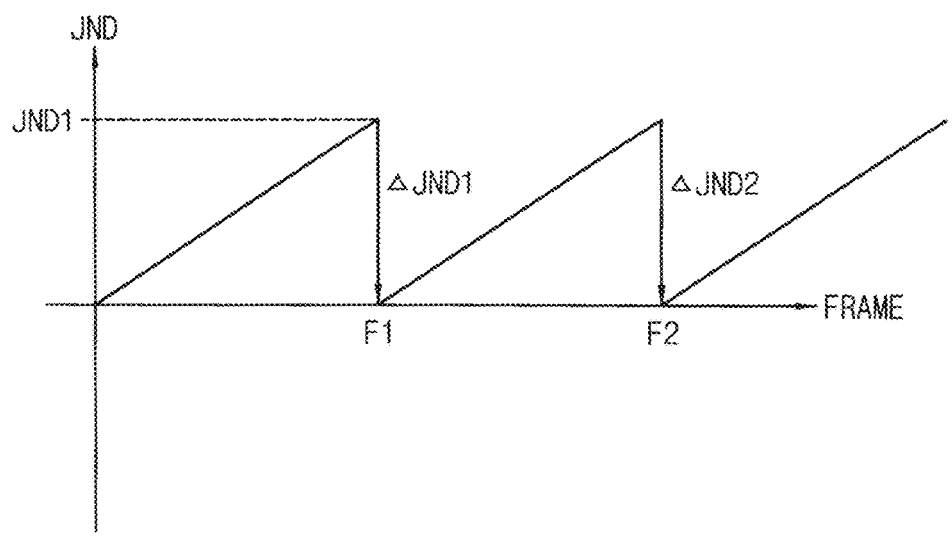
FIGS. 2A through 2C are graphs illustrating examples of a visual condition level of a content image changed by the method of FIG. 1 according to a frame.
Figure 2B:
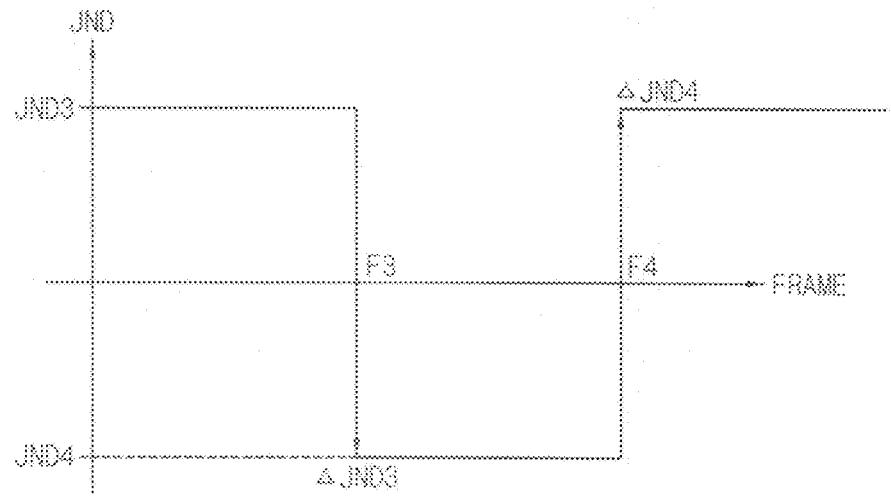
Figure 2C:
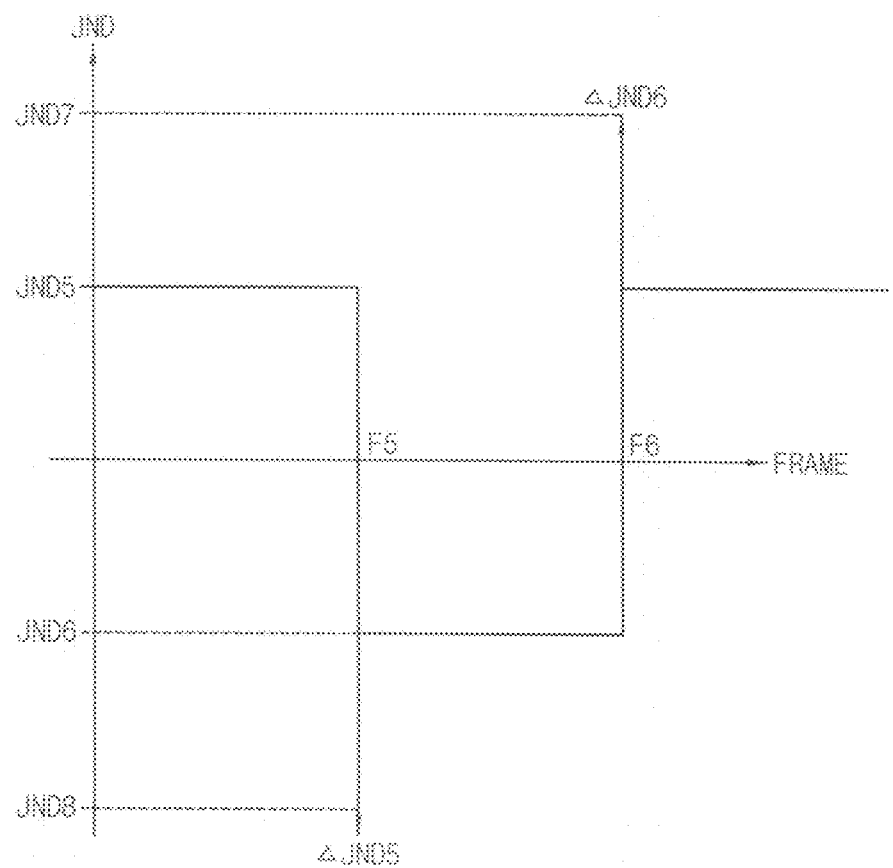

FIG. 1 is a flowchart illustrating an image processing method according to example embodiments. FIGS. 2A through 2C are graphs illustrating examples of a visual condition level of a content image changed by the method of FIG. 1 according to a frame. FIGS. 3A through 3D are frame images illustrating the content image having a visual condition changed by the method of FIG. 1.

Referring to FIGS. 1 through 3D, the image processing method of FIG. 1 includes outputting or transmitting a content image 110 having a visual condition (S110). The method also includes substantially periodically changing (or modulating) the visual condition of the content image 110 from a first visual condition to a second visual condition at a modulation timing F1 through F6 such that the content image 140 after the modulation timing F1 through F6 has the second visual condition that is distinguishable by human eyes from the first visual condition of the content image 130 before the modulation timing F1 through F6 (S120).

The method of FIG. 1 can prevent dry eyes syndrome and eyesight deterioration of the viewer. For example, the method of FIG. 1 allows the viewer to subconsciously close their eyes substantially periodically. The method of FIG. 1 can be applied to an electronic device (e.g., a television (TV), a mobile phone, a laptop computer, a tablet personal computer (PC), a computer monitor, an electronic book, etc.) displaying some content images for a long time.

In example embodiments, the method of FIG. 1 is performed by an image processing device or an image processor. For example, the method of FIG. 1 can be performed by a modulator included in the image processing device. The method of FIG. 1 can be stored at the memory of the image processing device as an algorithm, and the modulator can change the visual condition of the content image 110 based on the algorithm in the memory. For example, the modulator and the memory can be formed on a graphic card of the display device, an application processor (AP) of the mobile phone, or a driver integrated circuit (IC) of the display panel. Further, the modulator and the memory can be formed on a field programmable gate array (FPGA) board. The FPGA can be installed on the image processing device. However, a kind of performing the method of FIG. 1 is not limited thereto. In example embodiments, the method of FIG. 1 can be stored at various storage mediums readable by the image processing device, as the algorithm. In this case, the controller of the image processing device can perform the method of FIG. 1 by reading the method of FIG. 1 from the storage medium. For example, the storage medium can include SSD, HDD, CD, DVD, blue-ray disc, memory stick, USB memory, etc. The description of this paragraph applies to the embodiment shown in FIG. 8.

The method of FIG. 1 can output the content image 110. The content image 110 can include a still image and/or a moving image. If the content image 110 includes the moving image, the content image 110 can include a plurality of frame images different from each other at respective frames. The content image 110 can include image data. The image data can include digital signals and/or analog signals for the content image 110. For example, the image data includes a digital signal in the form of the following color coordinates: sRGB, scRGB, xvYCC, YCbCr, CIELAB, CIE-XYZ, etc. Here, the term, "content image" can mean not only an image displayed on a display unit (e.g., the still image and the moving image), but also the image data including the digital signals and/or the analog signals corresponding to the image.

The content image 110 can be received by an image input unit, and be output to a display unit by an image output unit. The content image 110 can be received by various methods. For example, the content image 110 is received from a broadcasting station via a broadcasting network, or received from an Internet server via an Internet network. Further, the content image 110 can be received from a storage medium (e.g., solid state drive (SSD), hard disc drive (HDD), compact disc (CD), digital versatile disc (DVD), blue-ray disc, memory stick, universal serial bus (USB) memory, etc.). In an example embodiment, the content image 110 is transmitted to the display unit. The display unit includes a display panel, and displays the content image 110. In another example embodiment, the content image 110 is transmitted to another image processing device.

The method of FIG. 1 can substantially periodically change the visual condition of the content image 110 at each predetermined modulation timing F1 through F6. The change of the visual condition of the content image 110 can be recognizable by the eyes or the viewer, but the change of the visual condition of the content image 110 can be unrecognizable by human consciousness (e.g., by human brain).

For example, the visual condition of the content image 110 can be instantly changed to provide the viewer with a subconscious stimulation, and the change of the visual condition can stimulate only the eyes. Humans need to blink substantially periodically so as to prevent dry eyes syndrome and eyesight deterioration. Generally, people blink about 15 to 20 times per minute so as to prevent the dry eyes syndrome.

However, when the people watch the display device, most people blink less than about 5 times per minute. If the number of blinks is reduced, the dry eyes syndrome can be intensified, and the eyesight can deteriorate. To prevent the dry eyes syndrome and the eyesight deterioration, the method of FIG. 1 changes the visual condition of the content image 110 at each modulation timing F1 through F6 that is repeated with a predetermined period. Accordingly, the viewer can subconsciously close their eyes according to the predetermined period. The visual condition can include various visual components stimulating an optic nerve of the eyes.

For example, the visual condition includes color, color temperature, luminance, or a gamma index of the content image 110. Since a nerve does not detect stimulation lower than a threshold, the optic nerve cannot detect a change of the color, a change of the color temperature, a change of the luminance or a change of the gamma index lower than the threshold. However, since the nerve can detect stimulation greater than the threshold, the optic nerve can detect the change of the color, the change of the color temperature, the change of the luminance or the change of the gamma index greater than the threshold. If the optic nerve detects the stimulation greater than the threshold instantly (or for a short duration), the eyes can subconsciously blink. The method of FIG. 1 allows the viewer's eyes to substantially periodically blink using a phenomenon described above.

In example embodiments, the method of FIG. 1 suddenly (or discontinuously) changes the visual condition of the content image 110 at each modulation timing F1 through F6, as illustrated in FIGS. 2A through 2C. In graphs of FIGS. 2A through 2C, a y-axis represents a visual condition level JND, and an x-axis represents a frame FRAME. Here, the visual condition level JND is defined as a quantitative level of the visual condition.

In some embodiments, the visual condition level JND does not have an absolute value. For example, assuming the visual condition of an original content image is a reference level (e.g., ZERO level), a visual condition difference between the visual condition of the original content image and the visual condition of the content image 110, 120, 130, and 140 at a specific frame is defined as the visual condition level JND at a corresponding frame. For example, if the original content image has a color temperature of 6125 Kelvin (K), and the content image at m frame has a color temperature of 6200K, the color temperature of 6125K is defined as the reference level (e.g., ZERO level), and the visual condition level JND at the m frame is a 75K (i.e., 6200K−6125K=75K). Further, if the original content image has a luminance of 300 nit, and the content image at the m frame has a luminance of 250 nit, the luminance of 300 nit is defined as the reference level, and the visual condition level JND at the m frame is a −50 nit (i.e., 250 nit−300 nit=−50 nit).

In some embodiments, the visual condition level JND has various values and units according to a type of the visual condition. As illustrated in FIGS. 2A through 2C, the visual condition level JND is suddenly changed at each modulation timing F1 through F6. A visual condition level ZERO, JND4 and JND8 after the modulation timing F1 through F6 is distinguished from other visual condition levels JND1, JND3 and JND5 before the modulation timing F1 through F6. In FIGS. 2A through 2C, the visual condition level difference between the visual condition level ZERO, JND4 and JND8, and the other visual condition level JND1, JND3 and JND5 is represented as "Δ JND".

As described above, the stimulation greater than the threshold needs to be applied to the viewer's eyes so as to induce subconscious blinking. The method of FIG. 1 applies the stimulation greater than the threshold to the viewer's eyes by suddenly changing the visual condition of the content image 110 at each modulation timing F1 through F6. In order to apply the stimulation greater than the threshold to the viewer's eyes, the visual condition level difference Δ JND having a value greater than the threshold is needed. The threshold can be selected based on an average sensitivity of the eyes.

For example, since the visual condition of content image 110 includes the color, the color temperature, the luminance or the gamma index, the threshold is selected to a minimum change of the color, a minimum change of the color temperature, a minimum change of the luminance or a minimum change of the gamma index that the eyes can detect. Accordingly, the method of FIG. 1 substantially periodically changes the visual condition of the content image 110 from a first visual condition to a second visual condition at each modulation timing F1 through F6 such that the content image 140 after the modulation timing F1 through F6 has the second visual condition that is distinguishable by eyes from the first visual condition of the content image 130 before the modulation timing F1 through F6.

In example embodiments, the visual condition of the content image 110 is changed according to the graph of FIG. 2A. The visual condition of the content image 110 gradually changes until the modulation timing F1 and F2. The gradual change of the visual condition is unrecognizable by the eyes. The visual condition of the content image 110 can be suddenly changed at the modulation timing F1 and F2. The sudden change of the visual condition is recognizable by the eyes.

For example, the visual condition of the content image 110 gradually changes to the first visual condition level JND1 until a pre-frame of the first modulation timing F1, and the visual condition of the content image 110 suddenly changes from the first visual condition level JND1 to the second visual condition level (e.g., ZERO level) at a post-frame of the first modulation timing F1.

The gradual change of the visual condition of the content image 110 is illustrated in FIGS. 3A through 3D. In FIGS. 3A through 3D, the change of the visual condition is illustrated in a change of shade of the content images 110, 120, 130 and 140.

Figure 3A:
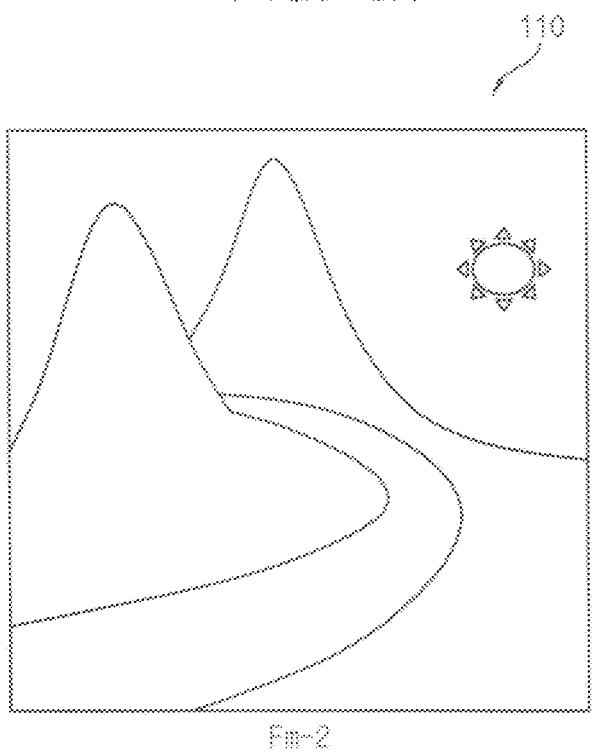
FIGS. 3A through 3D are frame images illustrating the content image having a visual condition changed by the method of FIG. 1.

As illustrated in FIG. 3A, the content image 110 at m−2 frame (Fm−2) can have a visual condition substantially the same as the visual condition of the original content image. The m−2 frame (Fm−2) can be a start frame. Since the content image 110 has the visual condition substantially the same as that of the original content image, the visual condition level JND at the m−2 frame (Fm−2) can have a ZERO level.

Figure 3B:
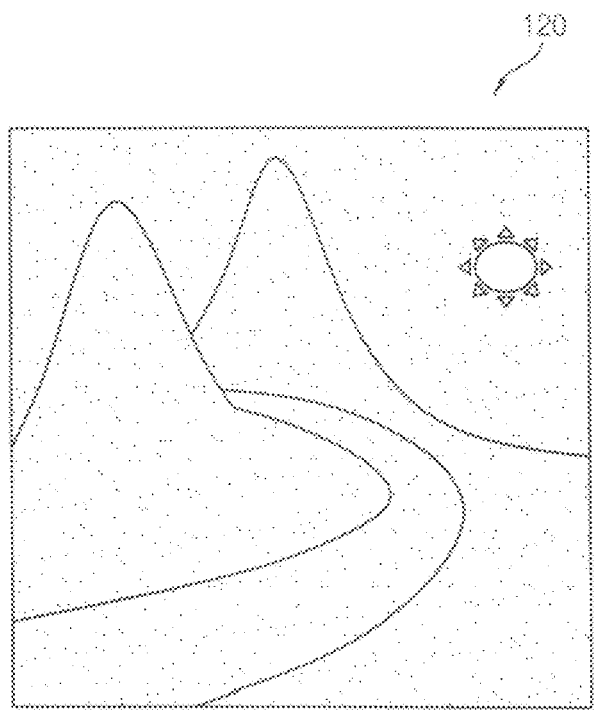

As illustrated in FIG. 3B, the visual condition of the content image 120 at m−1 frame (Fm−1) can be minutely changed. For example, the visual condition level JND of the content image 120 at the m−1 frame (Fm−1) is minutely increased from the ZERO level. However, the increase of the visual condition level JND from the m−2 frame (Fm−2) to the m−1 frame (Fm−1) is too small to be recognizable by the eyes. Although the content image 120 illustrated in FIG. 3B can be distinguished from the content image 110 illustrated in FIG. 3A, the content image 120 at the m−1 frame (Fm−1) is similar to the content image 110 at the m−2 frame (Fm−2), so that the eyes cannot distinguish the content image 120 at the m−1 frame (Fm−1) from the content image 110 at the m−2 frame (Fm−2).

Figure 3C:
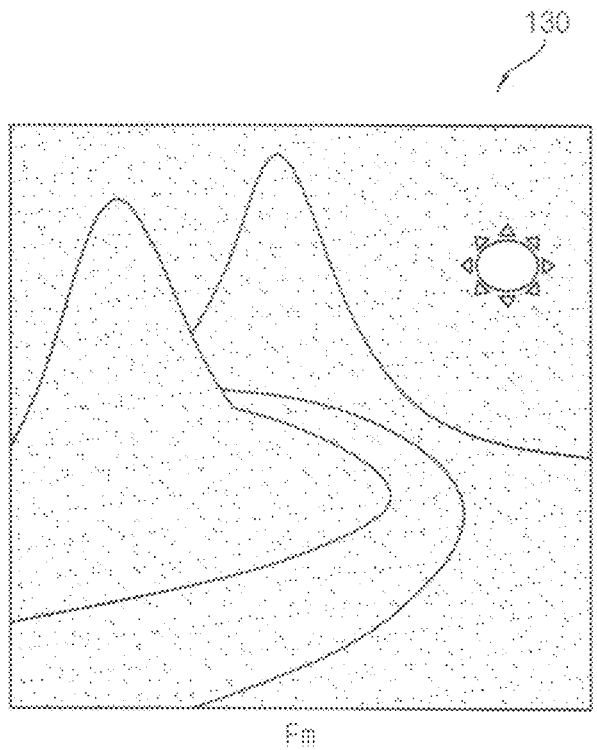

As illustrated in FIG. 3C, the visual condition of the content image 130 at the m frame (Fm) is minutely changed. For example, the visual condition level JND of the content image 130 at the m frame (Fm) is minutely increased from the visual condition level JND at the m−1 frame (Fm−1). However, the increase of the visual condition level JND from the m−1 frame (Fm−1) to the m frame (Fm) is too small to be recognizable by the eyes. Although the content image 130 illustrated in FIG. 3C can be distinguished from the content image 120 illustrated in FIG. 3B, the content image 130 at the m frame (Fm) is similar to the content image 120 at the m−1 frame (Fm−1), so that the eyes cannot distinguish the content image 130 at the m frame (Fm) from the content image 120 at the m−1 frame (Fm−1).

Figure 3D:
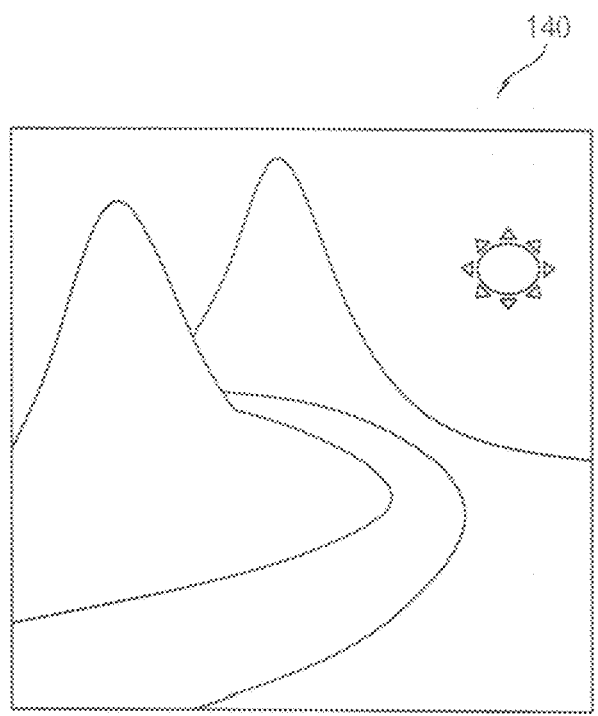

As illustrated in FIG. 3D, the visual condition of the content image 140 at m+1 frame (Fm+1) is suddenly changed. For example, the visual condition level JND of the content image 140 at the m+1 frame (Fm+1) is discontinuously (i.e., suddenly) decreased from the visual condition level JND at the m frame (Fm). For example, the visual condition level JND at the m+1 frame (Fm+1) and the visual condition level JND at the m frame (Fm) have a great visual condition level difference Δ JND. The m frame (Fm) is the pre-frame of the first modulation timing F1, and the m+1 frame (Fm+1) is the post-frame of the first modulation timing F1. The viewer can subconsciously recognize the sudden change of the visual condition at the first modulation timing F1.

The content image 140 is distinguished from the content image 130, so that the viewer can recognize the change of the visual condition between the content images 140 and 130. At the first modulation timing F1, the viewer can subconsciously blink. The sudden change of the visual condition of the content image 110 can be repeated by the predetermined period. For example, as illustrated in FIG. 2A, the visual condition level JND of the content image 110 is gradually increased to the first visual condition level JND1 until the first modulation timing F1, and the visual condition level JND of the content image 110 is suddenly decreased from the first visual condition level JND1 to the ZERO level at the first modulation timing F1.

After that, the visual condition level JND is gradually increased again to the first visual condition level JND1 until a second modulation timing F2, and the visual condition level JND is suddenly decreased again from the first visual condition level JND1 to the ZERO level at the second modulation timing F2. The viewer subconsciously blinks at the first modulation timing F1 and the second modulation timing F2, respectively. Since the sudden change of the visual condition at the modulation timing F1 and F2 is recognizable by the eyes, a first visual condition difference Δ JND1 at the first modulation timing F1 and a second visual condition difference Δ JND2 at the second modulation timing F2 can have a value greater than the threshold.

For example, each of the first visual condition difference Δ JND1 and the second visual condition difference Δ JND2 has a value greater than the minimum change of the color, the minimum change of the color temperature, the minimum change of the luminance, or the minimum change of the gamma index that is recognizable by the eyes. According to FIG. 2A, the viewer cannot recognize the gradual change of the visual condition of the content image 110, 120 and 130 from the start frame to the pre-frame of the first modulation timing F1, and the viewer cannot recognize the gradual change of the visual condition from the post-frame of the first modulation timing F1 to the pre-frame of the second modulation timing F2. But the viewer can recognize the sudden change of the visual condition of the content image 130 and 140 at the post-frame of the first modulation timing F1, and the viewer can recognize the sudden change of the visual condition at the post-frame of the second modulation timing F2. Therefore, the viewer subconsciously blinks at each modulation timing F1 and F2. Further, the method of FIG. 1 does not insert any additional frame image different from the content image 110, 120, 130 and 140, and does not excessively distort the content image 110, 120, 130 and 140, so that the viewer is able to continuously concentrate on the content image 110, 120, 130 and 140 without any disturbance.

In example embodiments, the visual condition of the content image 110 is changed according to the graph of FIG. 2B. For example, the visual condition of the content image 110 is sustained as a third visual condition level JND3 until a third modulation timing F3, and the visual condition of the content image 110 is suddenly changed from the third visual condition level JND3 to a fourth visual condition level JND4 at the third modulation timing F3. The sudden change of the visual condition at the third modulation timing F3 is recognizable by the eyes. After that, the visual condition of the content image 110 is sustained as the fourth visual condition level JND4 from the third modulation timing F3 until a fourth modulation timing F4, and the visual condition of the content image 110 is suddenly changed from the fourth visual condition level JND4 to the third visual condition level JND3 again at the fourth modulation timing F4.

The sudden change of the visual condition at the fourth modulation timing F4 is recognizable by the eyes. A sustained visual condition (e.g., JND3 and JND4) until the modulation timing F3 and F4 is similar to the visual condition (e.g., ZERO level) of the original content image, to minimize a distortion of the content image 110 displayed until the modulation timing F3 and F4. For example, the third and fourth visual condition levels JND3 and JND4 are adjacent to the ZERO level, so that the viewer cannot distinguish the content image 110 displayed until the modulation timing F3 and F4 from the original content image. However, since the sudden change is needed to be recognizable by the eyes, a third visual condition level difference Δ JND3 at the third modulation timing F3 and a fourth visual condition difference Δ JND4 at the fourth modulation timing F4 have a value greater than the threshold.

For example, the third and fourth visual condition levels JND3 and JND4 have a difference greater than the threshold. Therefore, the viewer can subconsciously blink at each modulation timing F3 and F4. According to FIG. 2B, the visual condition of the content image 110 converts between the third and fourth visual condition levels JND3 and JND4 at each modulation timing F3 and F4. Since each of the third and fourth JND3 and JND4 is adjacent to the ZERO level, the content image 110 displayed on the display unit is similar to the visual condition of the original content image. Thus, the viewer can stably watch undistorted contents, and the viewer can easily blink at each modulation timing F3 and F4.

In example embodiments, the visual condition of the content image 110 is changed according to the graph of FIG. 2C. For example, the visual condition of the content image 110 is sustained to a fifth visual condition level JND5 until a pre-frame of a fifth modulation timing F5. The visual condition of the content image 110 is suddenly changed from the fifth visual condition level JND5 to an eighth visual condition level JND8 at a post-frame of the fifth modulation timing F5. After the post-frame of the fifth modulation timing F5, the visual condition of the content image 110 is suddenly changed again from the eighth visual condition level JND8 to a sixth visual condition level JND6.

Further, the visual condition of the content image 110 is sustained to the sixth visual condition level JND6 from the after post-frame of the fifth modulation timing F5 until a pre-frame of a sixth modulation timing F6. The visual condition of the content image 110 is suddenly changed from the sixth visual condition level JND6 to a seventh visual condition level JND7 at a post-frame of the sixth modulation timing F6. After the post-frame of the sixth modulation timing F6, the visual condition of the content image 110 is suddenly changed again from the seventh visual condition level JND7 to the fifth visual condition level JND5. For example, the visual condition level JND of the content image 110 has a peak value at each modulation timing F5 and F6. Thus, the method of FIG. 1 largely stimulates the viewer's eyes at each modulation timing F5 and F6, and the viewer is forced to subconsciously blink at each modulation timing F5 and F6.

A sustained visual condition (e.g., JND5 and JND6) until the pre-frame of the modulation timing F5 and F6 is similar to the visual condition (e.g., ZERO level) of the original content image, so as to minimize a distortion of the content image 110 displayed until the pre-frame of the modulation timing F5 and F6. For example, the fifth and sixth visual condition level JND5 and JND6 are adjacent to the ZERO level, so that the viewer cannot distinguish the content image 110 displayed until the pre-frame of the modulation timing F5 and F6 from the original content image. However, since the change of the visual condition at the post-frame of the modulation timing F5 and F6 is needed to be recognizable by the eyes, a fifth visual condition level difference Δ JND5 at the fifth modulation timing F5 and a sixth visual condition difference Δ JND6 at the sixth modulation timing F6 have a value greater than the threshold.

As illustrated in FIG. 2C, the fifth visual condition level difference Δ JND5 is a difference between the fifth visual condition level JND5 and the eighth visual condition level JND8, and the sixth visual condition level difference Δ JND6 is a difference between the sixth visual condition level JND6 and the seventh visual condition level JND7. For example, the fifth and sixth visual condition level Δ JND5 and Δ JND6 difference has a value of about five times greater than the threshold. In example embodiments, the content image 110 has the seventh and eighth visual condition levels JND7 and JND8 at only one frame after the modulation timing F5 and F6.

Since the seventh and eighth visual condition levels JND7 and JND8 have a great difference from the ZERO level, the color, the color temperature, the luminance or the gamma index of the content image 110 are excessively changed at the modulation timing F5 and F6. Thus, the content image 110 have a distorted color, a distorted color temperature, a distorted luminance or a distorted gamma index at the post-frame of the modulation timing F5 and F6, but the content image having a distorted visual condition is displayed at only one frame, so that distorted visual condition is hard to be recognizable by the viewer. Therefore, the viewer subconsciously blinks at the modulation timing F5 and F6, and the viewer can continuously concentrate on the content.

Figure 4:
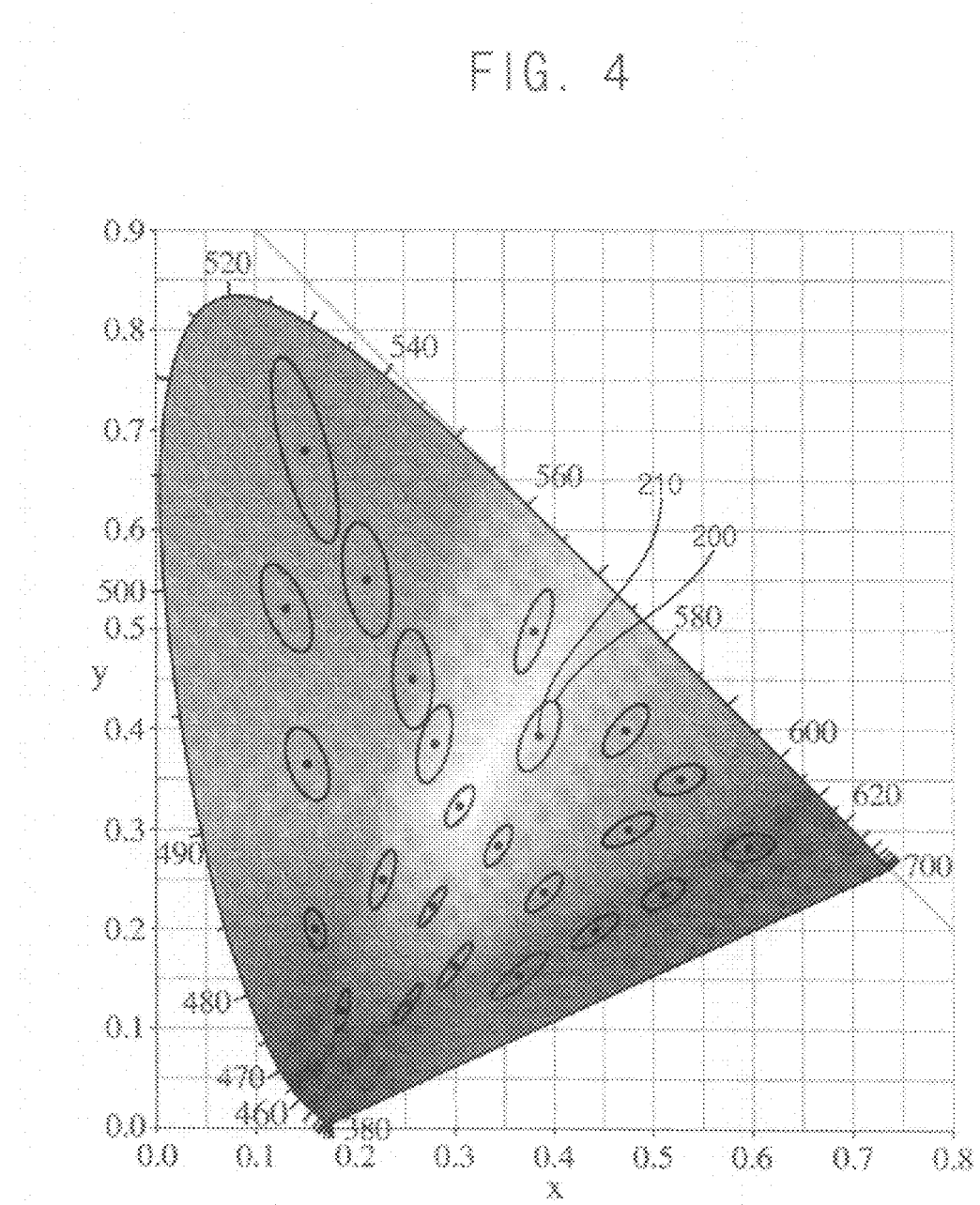
FIG. 4 is a chromaticity diagram illustrating an example of MacAdam ellipse used at the method of FIG. 1.
Figure 5:
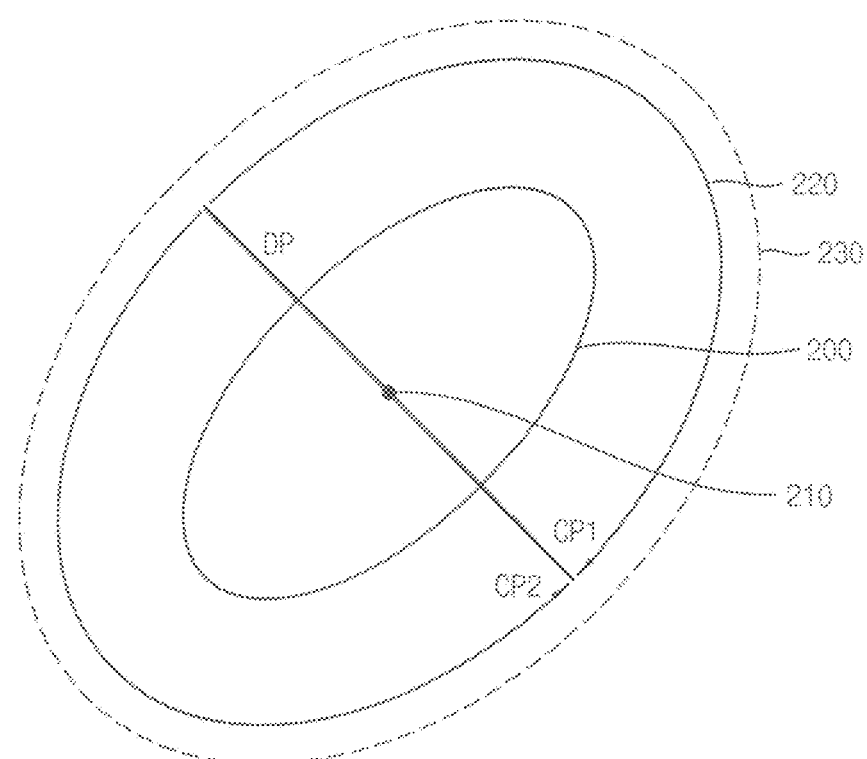
FIG. 5 is a diagram illustrating a method of changing the visual condition of the content image using the MacAdam ellipse of FIG. 4.

FIG. 4 is a chromaticity diagram illustrating an example of MacAdam ellipse used at the method of FIG. 1. FIG. 5 is a diagram illustrating a method of changing the visual condition of the content image using the MacAdam ellipse of FIG. 4.

Referring to FIGS. 4 and 5, in example embodiments, the method of FIG. 1 changes the visual condition of the content image 110 based on the MacAdam ellipse 200. The MacAdam ellipse 200 refers to the region on a chromaticity diagram which contains all colors which are indistinguishable by the eyes from a center color 210 at the center of the ellipse 200. Thus, the eyes cannot distinguish colors in the MacAdam ellipse 200 from the center color 210. For example, a CIE 1931 is used as the chromaticity diagram, but the chromaticity diagram is not limited by the above example.

In FIG. 4, the MacAdam ellipse 200 on the CIE 1931 is illustrated. The method of FIG. 1 changes the visual condition of the content image 110 based on the MacAdam ellipse 200. For example, as illustrated in FIG. 5, the method of FIG. 1 gradually changes the color of the content image 110 along a continuous trajectory CP1 or CP2 until the modulation timing F1 through F6. The method of FIG. 1 suddenly changes the color of the content image 110 along a discontinuous trajectory DP at the modulation timing F1 thorough F6. For example, when the method of FIG. 1 changes the color of the content image 110 according to the graph of FIG. 2A, the color of the content image 110 is gradually changed along the continuous trajectory CP1 or CP2 until the first modulation timing F1.

As described above, since the gradual change of the color has to be unrecognizable by the eyes, a method for minutely changing the color of the content image is needed. In example embodiments, the method of FIG. 1 minutely changes the color of the content image 110 based on an outer-ellipse 230 surrounding the MacAdam ellipse 200. The outer-ellipse 230 has an extra area greater than an area of the MacAdam ellipse 200. For example, the extra area is about three times greater than the area of the MacAdam ellipse 200. Although colors at an outside region of the MacAdam ellipse 200 is distinguishable by the eyes from the colors at an inside region of the MacAdam ellipse 200, the colors in the outer-ellipse 230 can be shown to be similar color to each other, when the outer-ellipse 230 has a similar area to that of the MacAdam ellipse 200. Thus, if the color of the content image 110 is minutely changed in the outer-ellipse 230, the minute change of the color can be minutely recognizable or substantially unrecognizable by the eyes.

In example embodiments, the color of the content image 110 is gradually changed along the continuous trajectory CP1 or CP2 in the outer-ellipse 230. The continuous trajectory CP1 or CP2 is a boundary trajectory of a reference ellipse 220 included in the outer-ellipse 230. Color coordinates of the continuous trajectory CP1 or CP2 on the chromaticity diagram can be calculated from an ellipse equation for the reference ellipse 220. The visual condition level JND of the content image 110 gradually changed until the pre-frame of the modulation timing F1 and F2 can be determined by the color coordinates of the continuous trajectory CP1 or CP2. For example, if the modulation timing F1 and F2 is repeated by a period of 240 frames, the color coordinates of the continuous trajectory CP1 or CP2 of each frame are calculated by dividing into 240 segments. The method of FIG. 1 changes the visual condition of the content image 110 by modulating the image data of the content image 110 based on the color coordinates of each frame.

In example embodiments, the color coordinates of each frame is pre-stored in a look-up table memory. The visual condition of the content image 110 can be changed based on the color coordinates of each frame pre-stored to the look-up table memory. In these embodiments, since information for the continuous trajectory CP1 or CP2 are pre-stored, the visual condition of the content image 110 changes quickly. The color of the content image 110 is suddenly changed along the discontinuous trajectory DP at the post-frame of the modulation timing F1 and F2. For example, the color of the content image 110 gradually changes along the continuous trajectory CP1 or CP2 from the $1^{st}$ frame to $240^{th}$ frame, and the color of the content image 110 changes suddenly along the discontinuous trajectory DP at the $241^{st}$ frame. Since the colors changed along the discontinuous trajectory DP are located at the outside region of the MacAdam ellipse 200, the eyes can recognize the sudden change of the color, and the viewer can subconsciously blink at the modulation timing F1 and F2.

Figure 6:
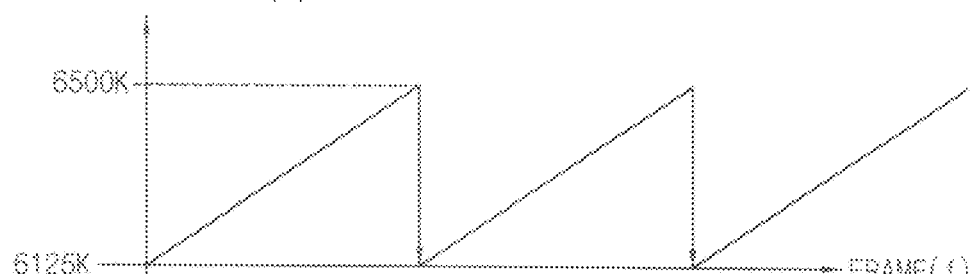
FIG. 6 is a graph illustrating an example of a color temperature of the content image changed by the method of FIG. 1 according to the frame.
Figure 7:
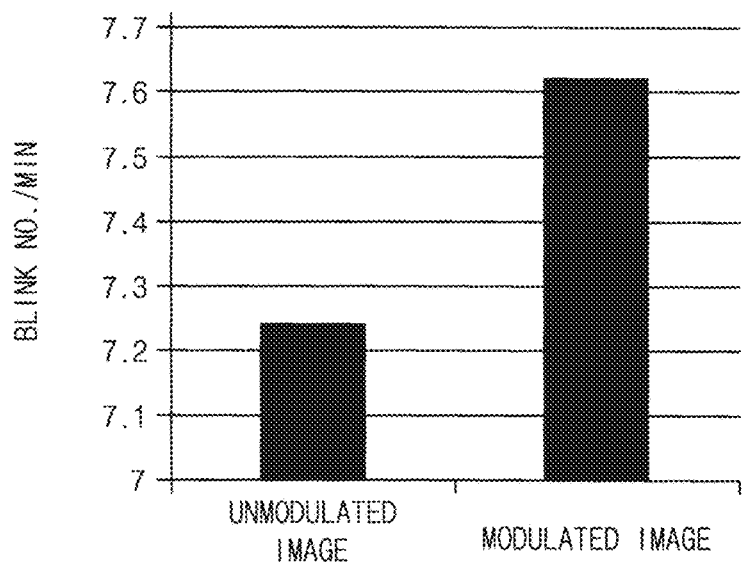
FIG. 7 is a graph illustrating the average number of blinks of the viewer when the color temperature is changed according to the graph of FIG. 6.

FIG. 6 is a graph illustrating an example of a color temperature of the content image changed by the method of FIG. 1 according to the frame. FIG. 7 is a graph illustrating the average number of blinks of the viewer when the color temperature is changed according to the graph of FIG. 6.

Referring to FIG. 6, the method of FIG. 1 changes the color temperature of the content image by the period of 240 frames For example, the display device operated at 60 Hertz (Hz) frequency displays 60 frame images per second. The eyes blink at a rate of about 15 times per minute, so that the average blinking period is about 4 seconds. The 4 seconds corresponds to 240 frame images on the display device operated at 60 Hz. Thus, the method of FIG. 1 changes the color temperature of the content image by the 240 frame period. The original content image can have a color temperature of 6125K. The method of FIG. 1 displays the original content image at the 1 frame (1f), and gradually changes the color temperature of the content image from 6125K to 6500K until 240 frames (240f).

The content image having the color temperature of 6500K can be distinguishable by the eyes from the original content image having the color temperature of 6125K. However, when the color temperature of the content image is minutely (or gradually) changed from 6125K to 6500K, the eyes cannot recognize the minute (or gradual) change of the color temperature. For example, when the color temperature at the $1^{st}$ frame (1f) is 6125K and the color temperature at the $2^{nd}$ frame is 6126.5K, the eyes cannot distinguish the color temperature of 6125K and the color temperature of 6126.5K. Therefore, the eyes cannot recognize the minute change of the color temperature from 1 frame (1f) to 240 frame (240f).

The method of FIG. 1 suddenly changes the color temperature of the content image at the $241^{st}$ frame from 6500K to 6125K. For example, the content image has the color temperature of 6500K at the $240^{th}$ frame (240f), and the content image has the color temperature of 6125K at the $241^{st}$ frame. As described above, the color temperature of 6500K is distinguishable by the eyes from the color temperature of 6125K, so that the viewer can subconsciously blink at the $241^{st}$ frame. The method of FIG. 1 changes the color temperature of the content image during an interval of the $241^{st}$ frame to the $480^{th}$ frame (480f) by the same method as that of 1 frame (1f) to 240 frame (240f). Further, the method of FIG. 1 changes the color temperature of the content image during an interval from the $481^{st}$ frame to the $720^{th}$ frame by the same method as the previous intervals. Therefore, the viewer can subconsciously blink about every 4 seconds.

Referring to FIG. 7, an average blinking number of the viewer is increased by about 5.5%, when the visual condition of the content image is changed according to the graph of FIG. 6. A group of viewers watching an unmodulated image (i.e., the content image having an unchanged visual condition) blinked about 7.2 times per minute, but a group of viewers watching a modulated image (i.e., the content image having the visual condition changed by the method of FIG. 1) blinked about 7.6 times per minute. As illustrated in FIG. 7, the method of FIG. 1 lets the viewer's eyes substantially periodically blink, so that the dry eyes syndrome and the eyesight deterioration can be effectively minimized.

As described above, the method of FIG. 1 suddenly changes the visual condition of the content image at each modulation timing, substantially periodically. The visual condition of the content image is sustained or minutely (or gradually) changed until the modulation timing. In some embodiments, the minute (or gradual) change of the visual condition is unrecognized by the eyes, so that the content image is not excessively distorted from the original content image. Further, the visual condition of the content image is suddenly changed at the modulation timing, so that the viewer can subconsciously blink at each modulation timing, substantially periodically. Therefore, according some embodiments, although the viewer watches some image content for a long time, the viewer's eyes do not not become tired, and the dry eyes syndrome and the eyesight deterioration can be effectively prevented by the method of FIG. 1.

Figure 8:
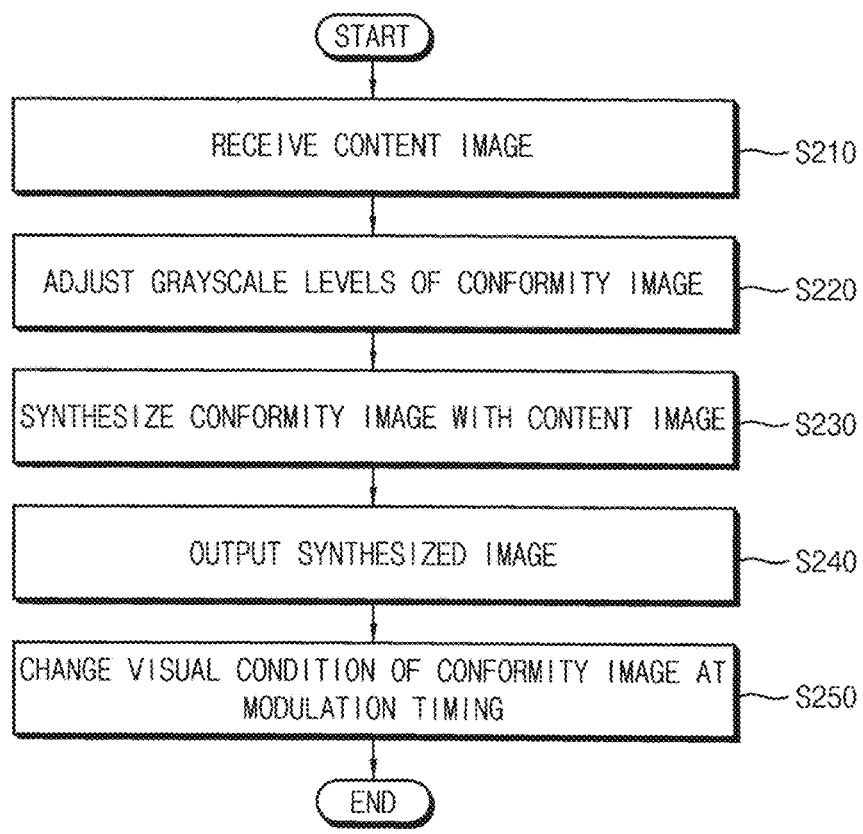
FIG. 8 is a flowchart illustrating an image processing method according to example embodiments.
Figure 10A:
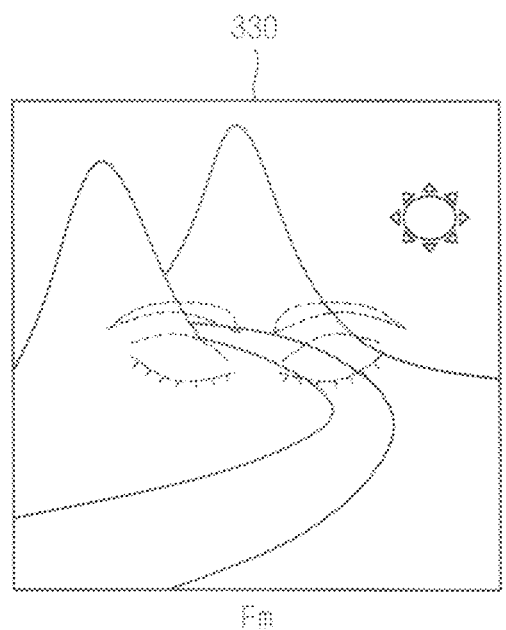
FIGS. 10A through 10C are diagrams illustrating frame images including the content image and the conformity image having a visual condition changed by the method of FIG. 8.
Figure 10B:
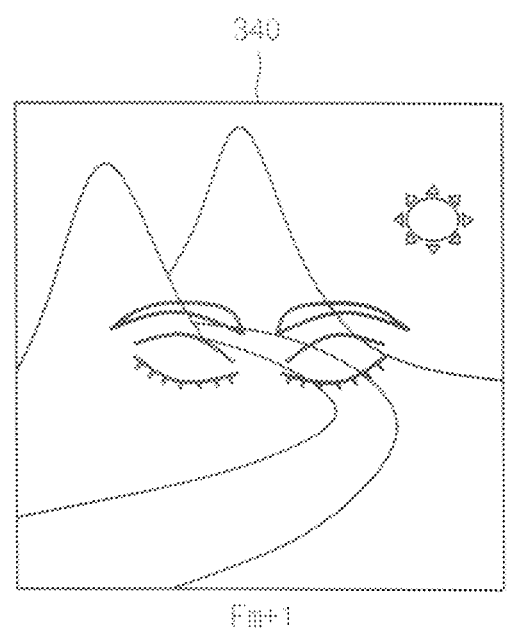
Figure 10C:
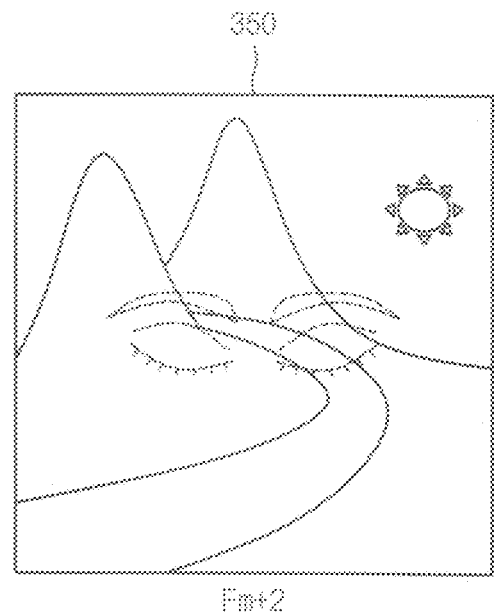

FIG. 8 is a flowchart illustrating an image processing method according to example embodiments. FIG. 9 is an image diagram illustrating an example of synthesizing a conformity image with a content image by the method of FIG. 8. FIGS. 10A through 10C are diagrams illustrating frame images including the content image and the conformity image having a visual condition changed by the method of FIG. 8.

Referring to FIGS. 8 through 10C, the method of FIG. 8 includes receiving a content image 310 (S210) and adjusting grayscale levels of a conformity image 320 based on grayscale levels of the content image 310 (S220). The method also includes synthesizing (i.e., overlap) the conformity image 320 having adjusted grayscale levels with the content image 310 (S230) and outputting or transmitting a synthesized image 330 having the content image 310 and the conformity image 320 to a display unit (S240). Furthermore, the method includes changing the visual condition of the conformity image 320 in the synthesized image 330 from a first visual condition to a second visual condition at a modulation timing such that the conformity image 320 after the modulation timing has the second visual condition that is distinguishable by eyes from the first visual condition of the conformity image 310 before the modulation timing (S250).

The method of FIG. 8 includes receiving the content image 310. The content image 310 can include a still image and/or a motion image. The content image 310 includes image data. The image data includes digital signals and/or analog signals for the content image 310. For example, the image data includes a digital signal such as sRGB, scRGB, xvYCC, YCbCr, CIELAB, CIE-XYZ, etc. The content image 310 can be received by various methods. For example, the content image 310 is received from a broadcasting station by a broadcasting network, or from an Internet server through a network. Further, the content image 310 can be received from a storage medium (e.g., SSD, HDD, CD, DVD, blue-ray disc, memory stick, USB memory, etc.).

The method of FIG. 8 includes synthesizing the conformity image 320 with the content image 310. The conformity image 320 can be used to stimulate the eyes. The viewer can subconsciously blink from viewing the conformity image 320. An image which can provide the viewers with psychological stability can be used as the conformity image 320, so that the viewer can stably blink. For example, as illustrated in FIG. 9, an image of closed eyes is used as the conformity image 320. The viewer can subconsciously close their eyes when the image of closed eyes is shown. Further, various images including a color, a picture or a landscape that provide the viewer with psychological stability is used as the conformity image 320. The conformity image 320 includes a still image.

In example embodiments, the conformity image 320 is synthesized with the content image 310, and the synthesized image 330 is indistinguishable by the viewer from the content image 310. For example, the method of FIG. 8 includes adjusting the grayscale level of the conformity image 320 based on the grayscale level of the content image 310 (S220), and synthesizing the conformity image 320 having the adjusted grayscale levels with the content image 310 (S230).

Since the conformity image 320 has the adjusted grayscale levels, the conformity image 320 is unrecognizable within the synthesized image 330. The viewer cannot recognize an existence of the conformity image 320 in the synthesized image 330. For example, the conformity image 320 includes lowly adjusted grayscale levels. If the conformity image 320 has highly adjusted grayscale levels, the conformity image 320 can be recognizable from the synthesized image 330, and the conformity image 320 can overlap the content image 310 on one screen. For example, the conformity image 320 is always shown, and the viewer cannot concentrate on the contents. However, the conformity image 320 has the lowly adjusted grayscale levels, the conformity image 320 is unrecognizable from the synthesized image 330, and the conformity image 320 is shown as the afterimage in the synthesized image 330.

According to a conformity effect, synthesized image 330 having the conformity image 320 as the after image can be undistinguishable by the eyes from the content image 310. Thus, the grayscale levels of the conformity image 320 is needed to be adjusted to low grayscale levels such that the synthesized image 330 is indistinguishable from the content image 310.

In example embodiments, the method of FIG. 8 includes adjusting the grayscale levels of the conformity image 320 based at least in part on the grayscale levels of the content image 310. For example, if the content image 310 has a red (R) grayscale level of 100, a green (G) grayscale level of 200 and a blue (B) grayscale level of 100 at a specific frame, and the conformity image 310 has a R grayscale level of 50, a G grayscale level of 40 and a B grayscale level of 30, the method of FIG. 8 adjusts the R grayscale level of the conformity image 320 to 5 (i.e., 50/10=5), the G grayscale level of the conformity image 320 to 8 (i.e., 40/5=8), and the B grayscale level of the conformity image 320 to 3 (i.e., 30/10=3), respectively.

The conformity image 320 having the adjusted grayscale levels can be synthesized with the content image 310. Accordingly, the content image 330 having the conformity image 310 (i.e., synthesized image) can have a R grayscale level of 105 (i.e., 100+5=105), a G grayscale level of 208 (i.e., 200+8=208), and a B grayscale level of 103 (i.e., 100+3=103). A grayscale level difference between the grayscale levels of the synthesized image 330 and of the content image 310 is too small to be recognizable by the eyes. Thus, the viewer cannot distinguish the synthesized image 330 from the content image 310, the viewer can regard the synthesized image 330 as substantially the same image as the content image 310. For example, the viewer cannot distinguish the R grayscale level of 105 from the R grayscale level of 100, the G grayscale level of 208 from the G grayscale level of 200, and the B grayscale level of 103 from the B grayscale level of 100. However, a method of synthesizing the conformity image 320 with the content image 310 is not limited thereto. In example embodiments, the conformity image 320 is synthesized with the content image 310 at each frame. For example, if the content image 310 displayed on the display unit has a motion image, the content image 310 includes a plurality of frame images different from each other. The conformity image 320 can be synthesized with each of the frame images such that the synthesized image 330 is unrecognizable by the eyes from the content image 310. Accordingly, the viewer can concentrate on the contents despite the synthesized conformity image 320.

The method of FIG. 8 includes outputting the synthesized image 330 to the display unit. In example embodiments, if the content image 310 includes a motion image, the conformity image 320 is synthesized with each of the frame images of the content image 310. Accordingly, the synthesized image 330 including a motion image is displayed on the display unit. As described above, since the synthesized image 330 is undistinguishable from the content image 310, the viewer can easily concentrate on the contents.

The method of FIG. 8 includes changing the visual condition of the conformity image 320 from the first visual condition to the second visual condition at the modulation timing (S250). The conformity image 320 can have the first visual condition at a pre-frame (Fm) before the modulation timing, and the conformity image 320 can have the second visual condition at a post-frame (Fm+1) after the modulation timing. The visual condition of the conformity image 320 can include a color, a color temperature, a luminance or a gamma index of the conformity image 320.

In example embodiments, the method of FIG. 8 includes gradually (or minutely) changing the visual condition of the conformity image 320 to the first visual condition until the pre-frame (Fm) before the modulation timing. The method of FIG. 8 includes suddenly changing the visual condition of the conformity image 320 from the first visual condition to the second visual condition at the post-frame (Fm+1) after the modulation timing. The gradual (or minute) change of the visual condition is unrecognizable, and the sudden change of the visual condition is recognizable. For example, the visual condition of the conformity image 320 is changed according to a graph illustrated in FIG. 2A. Since the visual condition changed in accordance with the graph of FIG. 2A is described above, the duplicate descriptions will not be repeated. The method of FIG. 8 does not include changing a visual condition of the content image 310, but it does include changing the visual condition of the conformity image 320, so that a distortion of the content image 310 can be minimized. According to the method of FIG. 8, the conformity image 320 is gradually sharpened from the synthesized image 330 until the pre-frame (Fm) of the modulation timing, and the conformity image 320 suddenly disappears from the synthesized image 330 at the post-frame (Fm+1) of the modulation timing. Since the sudden change of the visual condition of the conformity image 320 is recognizable by the eyes, the viewer can subconsciously blink at each modulation timing.

In example embodiments, the method of FIG. 8 includes sustaining the visual condition of the conformity image 320 as the first visual condition until the pre-frame (Fm) before the modulation timing. The method of FIG. includes suddenly changing the visual condition of the conformity image 320 from the first visual condition to the second visual condition at the post-frame (Fm+1) after the modulation timing. The sudden change of the visual condition is recognizable by the eyes. For example, the visual condition of the conformity image 320 is changed according to a graph illustrated in FIG. 2B. Since the visual condition changed in accordance with the graph of FIG. 2B is described above, the duplicate descriptions will not be repeated.

The method of FIG. 8 does not change a visual condition of the content image 310, but change the visual condition of the conformity image 320, so that a distortion of the content image 310 can be minimized. According to method of FIG. 8, the visual condition of the conformity image 320 can be converted at each modulation timing. For example, the conformity image 320 has the first visual condition until the pre-frame (Fm) of the modulation timing, and the visual condition of the conformity image 320 can be converted from the first visual condition to the second visual condition at the post-frame (Fm+1) of the modulation timing. The viewer can recognize the conformity image 320 at each modulation timing. In another example, the image of closed eyes can be suddenly shown at each modulation timing. Thus, the viewer can subconsciously blink at each modulation timing.

In example embodiments, the method of FIG. 8 includes sustaining the visual condition of the conformity image 320 as the first visual condition until the pre-frame (Fm) before the modulation timing. The method of FIG. 8 includes excessively changing the visual condition of the conformity image 320 at the post-frame (Fm+1) after the modulation timing. After the post-frame (Fm+2) the method of FIG. 8 includes changing and sustaining again the visual condition of the conformity image 320.

For example, the visual condition of the conformity image 320 is changed according to a graph illustrated in FIG. 2C. Since the visual condition changed in accordance with the graph of FIG. 2C is described above, the duplicate descriptions will not be repeated. The method of FIG. 8 does not change a visual condition of the content image 310, but it changes the visual condition of the conformity image 320, so that a distortion of the content image 310 can be minimized. According to the method of FIG. 8, the visual condition of the conformity image 320 is excessively changed at each post-frame (Fm+1) after each of the modulation timing.

For example, as illustrated in FIG. 10A, the conformity image 320 is displayed with the content image 310, and the synthesized image 330 is indistinguishable from the content image 310. Thus, the conformity image 320 can be regarded as a dim afterimage included in the synthesized image 330.

As illustrated in FIG. 10B, at the post-frame (Fm+1) after the modulation timing, the visual condition of the conformity image 320 can be excessively changed. For example, the color, the color temperature, the luminance, or the gamma index of the conformity image 320 are excessively changed, so that the conformity image 320 is distinctly shown from the synthesized image 330 at the post-frame (Fm+1) after the modulation timing. Since an excessive change of the visual condition of the conformity image 320 at the post-frame (Fm+1) stimulates the viewer's eyes, the viewer can subconsciously blink at the modulation timing.

As illustrated in FIG. 10C, at m+2 frame (Fm+2) (i.e., after the post-frame), the visual condition of the conformity image 320 is changed again, and the synthesized image 330 is indistinguishable from the content image 310. The viewer cannot recognize the existence of the conformity image 320 in the synthesized image 330. For example, the conformity image 320 is shown as the dim afterimage in the synthesized image 330. Since a synthesized image 340 including distinct conformity image 320 is instantly displayed only at the m+1 frame (Fm+1), the viewer can continuously concentrate on the content image after the m+2 frame (Fm+2). According to the method of FIG. 8, since the synthesized image 340 instantly displayed can stimulate the viewer's eyes, the viewer can easily blink at each modulation timing.

As described above, the method of FIG. 8 includes synthesizing the conformity image 320 with the content image 310. The conformity image 320 is synthesized with the content image 310, as an afterimage, and the synthesized image 330 is indistinguishable from the content image 310. The visual condition of the conformity image 320 is sustained or minutely (or gradually) changed until the modulation timing. The minute (or gradual) change of the visual condition is unrecognizable, so that the synthesized image 330 does not be excessively distorted from the content image 310. Further, the visual condition of the conformity image 320 can be suddenly changed at the modulation timing, so that the viewer can subconsciously blink at each modulation timing. Therefore, while the viewer watches some contents for a long time, the viewer's eyes does not get tired, and the dry eyes syndrome and the eyesight deterioration can be effectively prevented by the method of FIG. 8.

Figure 11:
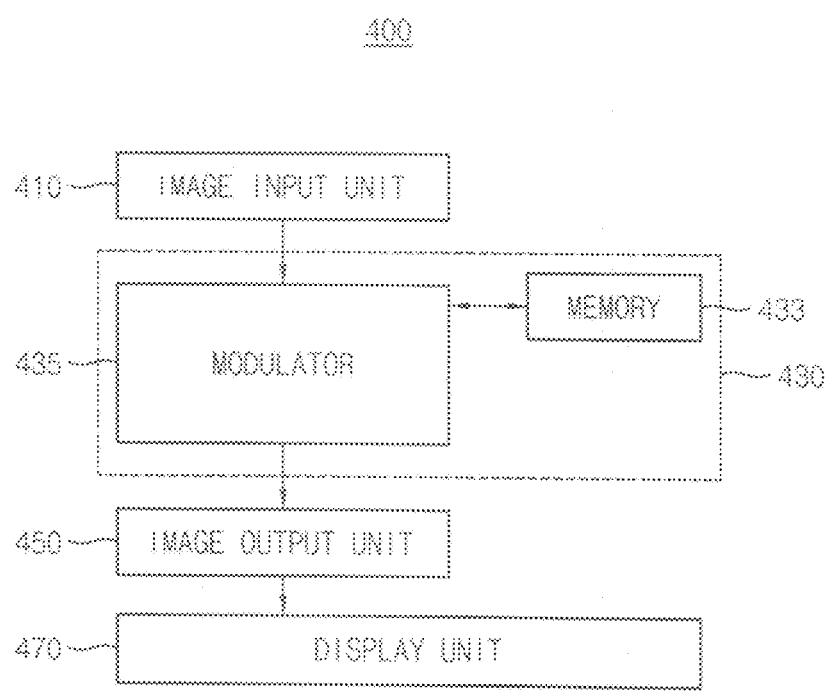
FIG. 11 is a block diagram illustrating an image processing device according to an example embodiment.

FIG. 11 is a block diagram illustrating an image processing device 400 according to an example embodiment.

Referring to FIG. 11, the image processing device 400 includes an image input unit 410 that receives a content image from an external source, a modulator 435 that changes a visual condition of the content image, a memory 433 connected to the modulator 435, and an image output unit 450 that outputs the content image to a display unit 470.

The image processing device 400 is an electronic device which processes the content image received from the outside, and outputs the content image to the display unit 470. For example, the image processing device 400 is a TV, a mobile phone, a laptop computer, a tablet PC, a computer monitor, an electronic book, etc.

The image input unit 410 receives the content image (i.e., a content image data) from the outside. For example, the image input unit 410 receives the content image from a broadcasting station by a broadcasting network, or the image input unit 410 receives the content image from an Internet server through a network. Further the image input unit 410 can receive the content image from a storage medium (e.g., SSD, HDD, CD, DVD, blue-ray disc, memory stick, USB memory, etc.). If the image input unit 410 receives the content image from the broadcasting station, the image input unit 410 includes e.g., a broadcasting network adapter. If the image input unit 410 receives the content image from the Internet server, the image input unit 410 includes e.g., an Internet network adapter. If the image input unit 410 receives the content image from the storage medium, the image input unit 410 includes e.g., an interface unit connecting the storage medium.

The modulator 435 substantially periodically changes the visual condition of the content image received by the image input unit 410, at each modulation timing. The visual condition of the content image can include a color, a color temperature, a luminance, or a gamma index of the content image. A period of the modulation timing can be an average blinking period of the eyes or a desired blinking period of the eyes. For example, the average blinking period of the eyes is about 4 seconds. In example embodiments, the modulator 435 gradually (or minutely) changes the visual condition of the content image to a first visual condition until the modulation timing. The modulator 435 can suddenly changes the visual condition of the content image from the first visual condition to a second visual condition at the modulation timing. The gradual (or minute) change of the visual condition is unrecognizable by the viewer, and the sudden change of the visual condition is recognizable by the viewer.

For example, the viewer cannot recognize the gradual change of the visual condition until the modulation timing but recognizes the sudden change of the visual condition at the modulation timing. Therefore, the viewer can subconsciously blink at each modulation timing. In another example embodiment, the modulator 435 sustains the visual condition of the content image as the first visual condition until the modulation timing, and the modulator 435 suddenly changes the visual condition of the content image at the modulation timing from the first visual condition to the second visual condition.

In still another example embodiment, the modulator 435 sustains the visual condition of the content image as the first visual condition until the modulation timing, such that the content image having the first visual condition is distinguishable by the viewer from the original content image. The modulator 435 excessively changes the visual condition of the content image from the first visual condition to the second visual condition at the modulation timing such that the content image having the second visual condition is distinguishable from the content image having the first visual condition. After that, the modulator 435 can sustain again the visual condition of the content image as the first visual condition. Since the visual condition of the content image is suddenly changed at each modulation timing, the viewer can recognize the sudden change of the visual condition, and the viewer can periodically blink at each modulation timing. Since the visual condition of the content image is changed in accordance with the graphs illustrated in FIGS. 2A through 2C, duplicate descriptions will not be repeated.

In example embodiments, the modulator 435 modulates the content image so as to generate a modulated image having the changed visual condition. For example, the modulator 435 generates the modulated image by changing the visual condition of the content image at the modulation timing. The modulator 435 receives the content image from the image input unit 410, and the modulator 435 provides the image output unit 450 with the modulated image by modulating the content image. Thus, the modulator 435 is connected to the image input unit 410 and the image output unit 450.

The memory 433 stores the method of changing visual condition of the content image as an algorithm. The modulator 435 changes the visual condition of the content image based on the algorithm read from the memory 433. For example, the memory 433 includes a non-volatile memory (e.g., erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), etc.), and/or a volatile memory (e.g., dynamic random access memory (DRAM), static random access memory (SRAM), mobile DRAM, etc.).

In example embodiments, the image processing device 400 further includes a controller which controls the modulator 435 and the memory 433, and processes the image data received from the image input unit 410. The controller can control the modulator 435 and the memory 433 by performing specific calculations or tasks. The controller can provide the image output unit 450 with the modulated image data received from the modulator 435 at a predetermined timing. The controller can include e.g., micro processing unit (MPU), central processing unit (CPU), etc. However, a kind of the controller is not limited thereto.

In example embodiments, the modulator 435, memory 433 and controller be included in a process module or processor 430. For example, the process module 430 is formed on a FPGA, and the FPGA is installed in the image processing device 400.

The image output unit 450 transmits the image data received from the modulator 435 to the display unit 470. The image output unit 450 includes an interface connected to the display unit 470. In an example embodiment, the image output unit 450 directly transmits the image data to the display unit 470. The image output unit 450 is electrically connected to the display unit 470. In another example embodiment, the image output unit 450 transmits the image data to another electronic device. Also, the content image can be transmitted to the display unit 470 via another electronic device.

The display unit 470 displays the content image. The display unit 470 includes a display panels. The image processing device 400 and the display unit 470 are part of one electronic device, or the image processing device 400 is separated from the display unit 470.

As described above, the image processing device 400 includes the modulator 435 changing the visual condition of the content image at each modulation timing repeated by a predetermined period. The modulator 435 changes the visual condition of the content image based on the method of changing the visual condition. The modulator 435 can sustain or minutely (or gradually) change the visual condition of the content image until the modulation timing. The minute (or gradual) change of the visual condition is unrecognizable by the viewer, so that the content image similar to an original content image can be displayed. Further, the modulator 435 can suddenly change the visual condition of the content image at the modulation timing, so that the viewer can subconsciously blink at each modulation timing. Therefore, in some embodiments, although the viewer watches some content for a long time, the viewer's eyes does not get tired, and the dry eyes syndrome and the eyesight deterioration can be effectively prevented by the image processing device 400.

FIG. 12 is a block diagram illustrating an image processing device according to another example embodiment.

Referring to FIG. 12, the image processing device 500 includes an image input unit 510 that receives a content image from an external source, a modulator 535 that changes a visual condition of the content image, a memory 533 connected to the modulator 535, and an image output unit 550 that transmits the content image to a display unit 570. Since all components except for the modulator 535 of the image processing device 500 are substantially same as corresponding components of the image processing device 400 of FIG. 11, duplicate descriptions will not be repeated.

The modulator 535 can substantially periodically change the visual condition of the content image, at each modulation timing. The visual condition of the content image can include a color, a color temperature, a luminance, or a gamma index of the content image. The modulation timing can be repeated by an average blinking period of the eyes. For example, the average blinking period is about 4 second. In example embodiments, the modulator 535 gradually (or minutely) changes the visual condition of the content image to a first visual condition until the modulation timing, and the modulator 535 suddenly changes the visual condition of the content image from the first visual condition to a second visual condition at the modulation timing. The gradual (or minute) change of the visual condition is unrecognizable by the eyes, and the sudden change of the visual condition is recognizable by the average eye. In another example embodiment, the modulator 535 sustains the visual condition of the content image to the first visual condition until the modulation timing, and the modulator 535 suddenly changes the visual condition of the content image at the modulation timing from the first visual condition to the second visual condition. In still another example embodiment, the modulator 535 sustains the visual condition of the content image to the first visual condition until a pre-frame before the modulation timing, and the modulator 535 excessively changes the visual condition of the content image at a post-frame after the modulation timing. After the post-frame, the modulator 535 sustains again the visual condition of the content image to the second visual condition such that the content image having the second visual condition is undistinguishable by the eyes from the original content image. Since the visual condition of the content image is changed in accordance with the graphs illustrated in FIGS. 2A through 2C, duplicate descriptions will not be repeated.

In example embodiments, the modulator 535 generates the control signal controlling the display unit 570, to change the visual condition of the content image. In these embodiments, the modulator 535 does not modulate the content image data (i.e., the content image), but directly controls the display unit 570. For example, the modulator 535 changes a luminance or a gamma index of the content image, as the visual condition of the content image. The modulator 535 can generate the control signal controlling the display unit 570 substantially periodically based at least in part on a method of changing the visual condition of the content image. The luminance or the gamma index of the content image can be changed by controlling a luminance or a gamma index of the display unit 570, without modulating the content image data. For example, the modulator 535 gradually changes the luminance or the gamma index of the display unit 570 until the modulation timing. And the modulator 535 can suddenly change the luminance or the gamma index of the display unit 570 at the modulation timing. The modulator 535 can be electrically disconnected from the image input unit 510 or the image output unit 550. The modulator 535 can be connected to the display unit 570, and the modulator 535 can provide the display unit 570 with the control signal controlling the display unit 570.

In example embodiments, the modulator 535 and memory 533 are included in a process module 530. For example, the process module 530 is formed on a driver IC of the display unit 570.

As described above, the image processing device 500 can include the modulator 535 changing the visual condition of the content image at each modulation timing repeated by a predetermined period. The modulator 535 can change the visual condition of the content image by directly controlling the display unit 570, without modulating the content image data. Accordingly, an image processing method which prevents dry eyes syndrome and eyesight deterioration can be easily performed.

Although a few example embodiments (e.g., an image processing method and an image processing device for performing the image processing method) have been described, those skilled in the art will readily appreciate that many modifications are possible in the example embodiments without materially departing from the novel teachings and advantages of the described technology.

The described technology can be applied to an electronic device (e.g., mobile phone, tablet PC, personal digital assistant (PDA), potable multimedia play (PMP), MP3 player, TV, desktop computer, laptop computer, digital camera, camcorder, game console, set-top box, electronic book, etc.).

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image processing method for a display device, the method comprising:
   displaying a content image having a visual condition on a display unit of the display device;
   changing, at a processor of the display device, the visual condition of the content image from a first visual condition to a second visual condition different from the first visual condition at a (2N−1)th modulation timing, where N is an integer greater than 0;
   maintaining, at the processor, the visual condition of the content image as the second visual condition during a period from the (2N−1)th modulation timing to the (2N)th modulation timing; and
   changing, at the processor, the visual condition of the content image from the second visual condition to the first visual condition at the (2N)th modulation timing.

2. The method of claim 1, wherein the visual condition of the content image is changed from the first visual condition to the second visual condition via a third visual condition at the (2N−1)th modulation timing, and
   wherein a first difference between the first visual condition and the third visual condition is greater than a second difference between the first visual condition and the second visual condition.

3. The method of claim 2, wherein the visual condition of the content image is changed from the second visual condition to the first visual condition via a fourth visual condition at the (2N)th modulation timing, and
   wherein a third difference between the first visual condition and the fourth visual condition is greater than the second difference.

4. The method of claim 1, wherein the period from the (N)th modulation timing to the (N+1)th modulation timing is substantially the same as a desired blinking period of eyes.

5. The method of claim 1, wherein the visual condition includes at least one of a color, a color temperature, a luminance and a gamma index of the content image.

6. The method of claim 1, wherein the visual condition is changed based on a MacAdam ellipse of a predetermined color.

7. The method of claim 6, wherein the visual condition is changed in an outer-ellipse having an extra area greater than the area of the MacAdam ellipse.

8. An image processing method for a display device, the method comprising:
   receiving, at an input image unit of the display device, a content image;
   synthesizing, at a processor of the display device, a conformity image having a visual condition with the content image so as to generate a synthesized image, wherein the synthesizing includes:
      adjusting grayscale levels of the conformity image based at least in part on grayscale levels of the content image; and
      overlapping the conformity image having the adjusted grayscale levels with the content image;
   displaying the synthesized image on a display unit of the display device; and
   periodically changing, at the processor, the visual condition from a first visual condition to a second visual condition at a modulation timing.

9. The method of claim 8, wherein the visual condition is i) gradually changed from the second visual condition to the first visual condition during a period from a (N)th modulation timing to a (N+1)th modulation timing and ii) directly changed from the first visual condition to the second visual condition at the (N+1)th modulation timing, where N is an integer greater than 0.

10. The method of claim 8, wherein the visual condition is i) changed from the first visual condition to the second visual condition at a (2N−1)th modulation timing, ii) maintained as the second visual condition during a period from the (2N−1)th modulation timing to the (2N)th modulation timing, and iii) changed from the second visual condition to the first visual condition during at the (2N)th modulation timing, where N is an integer greater than 0.

11. The method of claim 10, wherein the visual condition is i) changed from the first visual condition to the second visual condition via a third visual condition at a (2N−1)th modulation timing, and wherein a first difference between the first visual condition and the third visual condition is greater than a second difference between the first visual condition and the second visual condition.

12. The method of claim 11, wherein the visual condition of the content image is changed from the second visual condition to the first visual condition via a fourth visual condition at the (2N)th modulation timing, and wherein a third difference between the first visual condition and the fourth visual condition is greater than the second difference.

13. The method of claim 8, wherein the visual condition includes at least one of a color, a color temperature, a luminance and a gamma index of the conformity image.

14. The method of claim 8, wherein the visual condition is changed based on a MacAdam ellipse of a predetermined color.

15. The method of claim 14, wherein the visual condition is changed in an outer-ellipse having an extra area greater than the area of the MacAdam ellipse.

16. The method of claim 8, wherein the period of the modulation timing is substantially the same as a desired blinking period of eyes.

17. An image processing device of a display device, comprising:
   an image input unit configured to receive a content image having a visual condition including first and second visual conditions that are different from each other;

a processor configured to change the visual condition of the content image from a first visual condition to a second visual condition at a (2N−1)th modulation timing, to maintain the visual condition of the content image as the second visual condition during a period from the (2N−1)th modulation timing to the (2N)th modulation timing, and to change the visual condition of the content image from the second visual condition to the first visual condition at the (2N)th modulation timing, where N is an integer greater than 0;

an image output unit configured to provide the content image; and a display unit configured to receive and display the content image.

18. The device of claim 17, wherein the processor changes the visual condition of the content image from the first visual condition to the second visual condition via a third visual condition at the (2N−1)th modulation timing, and wherein a first difference between the first visual condition and the third visual condition is greater than a second difference between the first visual condition and the second visual condition.

19. The device of claim 18, wherein the processor changes the visual condition of the content image from the second visual condition to the first visual condition via a fourth visual condition at the (2N)th modulation timing, and wherein a third difference between the first visual condition and the fourth visual condition is greater than the second difference.

* * * * *